United States Patent
Khanagha et al.

(10) Patent No.: US 10,510,363 B2
(45) Date of Patent: *Dec. 17, 2019

(54) PITCH DETECTION ALGORITHM BASED ON PWVT

(71) Applicant: OmniSpeech LLC, College Park, MD (US)

(72) Inventors: Vahid Khanagha, College Park, MD (US); Alton Keel, College Park, MD (US)

(73) Assignee: OmniSpeech LLC, College Park, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/475,992

(22) Filed: Mar. 31, 2017

(65) Prior Publication Data

US 2017/0287507 A1  Oct. 5, 2017

Related U.S. Application Data

(60) Provisional application No. 62/316,432, filed on Mar. 31, 2016.

(51) Int. Cl.
  *G10L 25/90* (2013.01)
  *G10L 25/18* (2013.01)
  *G10L 25/06* (2013.01)

(52) U.S. Cl.
  CPC ............. *G10L 25/90* (2013.01); *G10L 25/06* (2013.01); *G10L 25/18* (2013.01)

(58) Field of Classification Search
  None
  See application file for complete search history.

(56) References Cited

U.S. PATENT DOCUMENTS

| | | | |
|---|---|---|---|
| 5,247,515 A * | 9/1993 | White | H04J 1/04 370/484 |
| 6,004,017 A | 12/1999 | Madhavan | |
| 7,493,254 B2 | 2/2009 | Jung et al. | |
| 8,793,128 B2 | 7/2014 | Miki | |
| 9,153,245 B2 | 10/2015 | Qi et al. | |
| 10,204,643 B2 * | 2/2019 | Khanagha | G10L 25/06 |
| 2004/0204880 A1 * | 10/2004 | Cheriet | H04B 17/309 702/77 |
| 2005/0107926 A1 * | 5/2005 | Enders | B60R 16/023 701/1 |
| 2011/0099007 A1 | 4/2011 | Zhang | |

(Continued)

OTHER PUBLICATIONS

Ghaemmaghami et al.; An Improved Model for Speech Excitation using Time-Frequency Characterisation; Fifth International Symposium on Signal Processing and its Applications, ISSPA '99, Brisbane, Austrlia, Aug. 22-25, 1999. pp. 47-50.*

(Continued)

*Primary Examiner* — Abul K Azad
(74) *Attorney, Agent, or Firm* — Maier & Maier, PLLC

(57) ABSTRACT

A pitch detection method. Such a pitch detection method may apply Pseudo Weigner Ville Transformation (PWVT) as a spectral representation of speech signal. Also, the pitch detection method may take the median value of each frame of the speech signal as a threshold for making the voicing decision. Additionally, the pitch detection method may take a moving average of PWVT as the threshold for voicing decision.

13 Claims, 1 Drawing Sheet

(56) References Cited

U.S. PATENT DOCUMENTS

2013/0335267 A1 12/2013 Heo et al.
2016/0259849 A1 9/2016 Sinha et al.

OTHER PUBLICATIONS

Cohen et al.; A spectral network model of pitch perception; Journal—Acoustical Society of America. 98(2//PT1); pp. 862-862. (Year: 1995).*
Bradford et al.; Variations in the Dynamic Properties of Structures: The Wigner-Ville Distribution; Proceedings of the 8th U.S. National Conference on Earthquake Engineering, Apr. 18-22, 2006, San Francisco, Paper No. 1439; California, USA (Year: 2006).*
Rainer Martin, "Spectral Subtraction Based on Minimum Statistics", Institute for Communication Systems and Data Processing (IND), Aachen University of Technology, Published: Nov. 3, 2009, 4 pgs.

\* cited by examiner

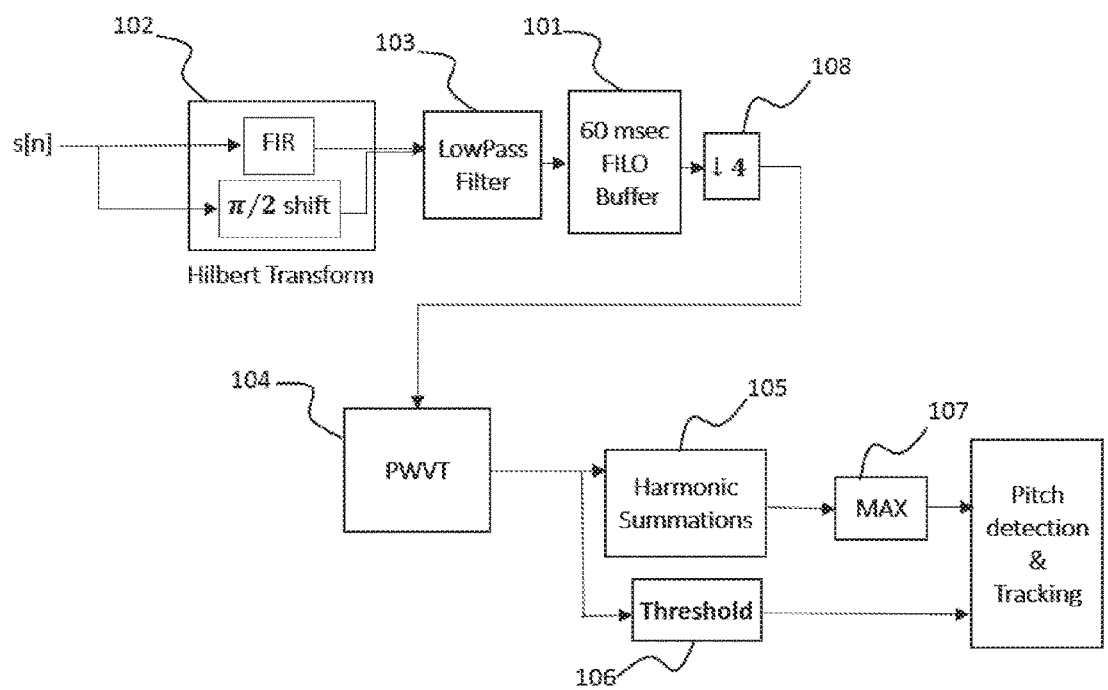

ced on the discrete time signal for
a real part of the complex value, and the discrete time signal
is shifted in amount of π/2 for an imaginary part of the
complex value, an anti-aliasing low-pass filter with cut-off
frequency of 1 kHz is applied to low-pass filter the complex
value, the complex value is buffered to form the analysis
window with 60 msec length, and the complex value is down
sampled by a factor 4.

PITCH DETECTION ALGORITHM BASED ON PWVT

CROSS REFERENCE TO RELATED APPLICATIONS

This application claims priority from U.S. Provisional Patent Application Ser. No. 62/316,432, filed Mar. 31, 2016, the entire contents of which are hereby incorporated by reference.

BACKGROUND

There are two general categories of pitch detection algorithms. Time domain algorithms rely on the periodic shape of a speech waveform over time and use different measures of periodicity such as the autocorrelation function or Average Magnitude Difference Function (AMDF) to evaluate the periodicity of the waveform. These methods are often computationally expensive and are also prone to insertion errors when dealing with correlated type of noise, as they cannot discriminate between tonal periodicity of a correlated noise and the rich harmonically structured periodicity of speech.

Frequency domain methods however, are based on direct evaluation of the existence of speech harmonic frequency structure, using one of the many available spectral representation techniques such as short term Fourier transform, wavelet transform, Cepstrum and others. The success of the frequency domain methods depend on their ability to resolve frequency components of the speech, especially in the presence of noise. The latter usually requires a relatively large analysis window (as large as 100 msec) which is not suitable for real-time applications that require the lowest possible processing delay. Moreover, a large analysis window compromises the time resolution of the pitch estimates.

There are many existing types of prior art for pitch detection. They are based on many different criteria, in time-domain or frequency domain, for estimating the pitch. They differ, however, on their ability to be implemented in real-time with low latency and computational cost.

SUMMARY

According to at least one exemplary embodiment, a pitch detection method may be described. Such a method may provide a clear spectral representation of a noisy speech signal using a relatively small analysis window (60 msec). Such a method may use a soft threshold to reduce the sensitivity of the algorithm to amplitude variations of the signal. Also, in an exemplary embodiment, as the threshold is not set with a hard value, the algorithm can adapt to any new database.

Such an exemplary pitch detection method may include: sampling a signal to generate a discrete time signal; generating a complex value of the discrete time signal; computing Pseudo Weigner Ville Transformation (PWVT) on the complex value to generate a spectral representation of the signal; computing a harmonic summation on the spectral representation to generate a pitch candidate; and deciding the pitch candidate as a pitch value if the pitch candidate is larger than a threshold.

In another embodiment, a pitch detection method may include: applying Hilbert Transform to the discrete time signal to generate a complex valued signal, which is then low-pass filtered, buffered to generate an analysis window and down-sampled. In the pitch detection method, when applying Hilbert Transform, a half band Finite-Impulse-Response (FIR) filter is applied to the discrete time signal for a real part of the complex value, and the discrete time signal is shifted in amount of $\pi/2$ for an imaginary part of the complex value, an anti-aliasing low-pass filter with cut-off frequency of 1 kHz is applied to low-pass filter the complex value, the complex value is buffered to form the analysis window with 60 msec length, and the complex value is down sampled by a factor 4.

In still another embodiment, when computing PWVT, PWVT is computed by a 512 point Discrete Fast Fourier Transform (DFFT) representing a frequency content of the signal over time in the frequency range of 0 to 1 Khz. Also, when computing the harmonic summation on the spectral representation, the harmonic summation is computed within the human pitch frequency range.

In another embodiment, when deciding the pitch candidate as the pitch value, the pitch candidate is taken as the location of peak of the harmonic summation, and the threshold is fifty times that of a median value of the spectral representation.

In yet another embodiment, when deciding the pitch candidate as the pitch value, the maximum value of the harmonic summation is compared against two thresholds, and a pitch detection decision is made if the maximum value of the harmonic summation is higher than at least one of these two thresholds, where the thresholds are the median value of the PWVT and the average value of the maximum of the harmonic summation over more than one hundred frames in which the no pitch was detected.

BRIEF DESCRIPTION OF THE FIGURES

Advantages of embodiments of the present invention will be apparent from the following detailed description of the exemplary embodiments thereof, which description should be considered in conjunction with the accompanying drawings in which like numerals indicate like elements, in which:

FIG. 1 is an exemplary block diagram of a pitch detection algorithm according to an exemplary embodiment.

DETAILED DESCRIPTION

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

Further, many of the embodiments described herein are described in terms of sequences of actions to be performed by, for example, elements of a computing device. It should be recognized by those skilled in the art that the various sequences of actions described herein can be performed by specific circuits (e.g. application specific integrated circuits (ASICs)) and/or by program instructions executed by at least one processor. Additionally, the sequence of actions described herein can be embodied entirely within any form of computer-readable storage medium such that execution of the sequence of actions enables the at least one processor to perform the functionality described herein. Furthermore, the sequence of actions described herein can be embodied in a combination of hardware and software. Thus, the various aspects of the present invention may be embodied in a number of different forms, all of which have been contemplated to be within the scope of the claimed subject matter. In addition, for each of the embodiments described herein, the corresponding form of any such embodiment may be described herein as, for example, "a computer configured to" perform the described action.

According to an exemplary embodiment, and referring to FIG. 1 generally, a pitch detection method may be provided. According to one exemplary embodiment, the pitch detection method can provide a clear spectral representation of noisy speech signal using a relatively small analysis window (60 msec). Such a method may use a soft threshold to reduce the sensitivity of the algorithm to amplitude variations of the signal. Also in an exemplary embodiment, as the threshold is not set with a hard value, the algorithm can adapt to any new database. One exemplary advantage of the method is in its ability to make a precise estimation of the pitch frequency in many different noise scenarios at very low signal to noise ratios.

Human speech includes both voiced and unvoiced segments. The voiced sound is the part generated by vibration of vocal folds and has a rich harmonic frequency content such that frequency activity is observed as harmonically spaced sharp peaks.

The spacing between harmonics is equal to the value of first harmonic, which is called the pitch or fundamental frequency of the human voice. In noisy environments, this harmonic structure can be used as an indication of speech existence and hence be used as a Voice Activity Detector (VAD) that separates frames containing speech from those containing noise. Precise detection of the value of pitch frequency and also the VAD functionality are often utilized in speech processing or recognition algorithms.

According to an exemplary embodiment, a pitch detection method may use the Pseudo Weigner Ville Transformation (PWVT) to build a time-frequency representation of the voiced speech signal to reveal the harmonic structure when it exists. Also, in an exemplary embodiment, the harmonic summations of the PWVT representation may be applied to evaluate the existence of harmonic structure and to make a precise estimation of pitch frequency.

Turning now to exemplary FIG. 1, FIG. 1 shows an exemplary block diagram of a pitch detection algorithm. In FIG. 1, the discrete time speech signal (s[n]) may be assumed to be sampled at 8 kHz and fed to the pitch detection algorithm as 10 msec frames (80 samples at 8 kHz). Referring to FIG. 1, as the PWVT operates on complex input signals, at first, a Hilbert Transform 102 is applied to the signal (s[n]). The Hilbert transform 102 is implemented in time-domain using a half band Finite-Impulse-Response (FIR) filter. The output of the FIR filter forms the real part and the shifted version of the speech signal (equal to π/2) forms the imaginary part. Consequently, the resulting complex values are low-pass filtered by an anti-aliasing low-pass filter 103 with a cut-off frequency of 1 kHz and then buffered to form an analysis window 101 of 60 msec length. Consequently, after down-sampling the analysis window by a factor of 4 (e.g. the reference number 108 of FIG. 1), the PWVT 104 is computed.

According to an exemplary embodiment, the PWVT 104 may be computed by taking the Discrete Fast Fourier Transform (DFFT) of the following discrete time correlation summation:

$$w[m] = \sum_{k=-256}^{256} g[k]s[k+m]s^*[k-m], m = -255:254 \qquad \text{Equation 1}$$

where g is a Gaussian smoothing window, m denotes a time index and k denotes a frequency index. Once w[m] is computed, it is multiplied by another Gaussian window before computation of the 512 points DFFT to obtain the transformation as PWVT[m, k]. PWVT[m, k] can provide a high-resolution spectral representation of the first 1 Khz of the frequency content of the signal.

Referring still to exemplary FIG. 1, after obtaining PWVT [m, k], the absolute value of this representation may be used to evaluate the existence of harmonically structured frequency activities that are expected to appear during the voiced parts of the speech signal. For doing so, the Harmonic summations 105 of the PWVT[m, k] are computed as:

$$HS[m, k] = \qquad \text{Equation 2}$$
$$\sum_{q=1}^{N_q} PWVT[m, qk] - \sum_{q=1}^{N_q} PWVT[m, \text{round}((q+0.5)k)]$$

According to an exemplary embodiment, HS[m, k] is being computed only in the frequency range that corresponds to the range of human pitch frequency (60 Hz to 400 Hz). If a given analysis window contains voiced speech with a pitch frequency corresponding to frequency bin $k_0$, PWVT [m,k] may show prominent peaks at integer multiplies of $k_0$ with valleys located in the middle of two peaks. Consequently, HS[m, k] is expected to generate prominent maxima at the bin $k_0$. Thus, in an exemplary embodiment, the location of maximum of HS[m, k] ($k_{max}$) may be taken as a candidate for the pitch (e.g. reference number 107 of FIG. 1). If the frame-under-processing belongs to a voiced segment of the speech signal, HS[m, $k_{max}$] should attain a very high value. Accordingly, in an exemplary embodiment, a threshold can be used in deciding whether the computed value is high enough to decide whether the current frame is a voiced one or not.

According to an exemplary embodiment, to reduce the sensitivity of the algorithm to input signal power variations, a soft threshold is applied to make the final decision (instead of a fixed hard threshold that is vulnerable to input level variations). To do so, the median value of PWVT[m, k] is taken as the noise floor level ($N_f$) (e.g. reference number 106 of FIG. 1) and then if HS[m, $k_{max}$] is larger than, for example, 50 times the noise floor, the frame being processed is considered a voiced frame and $K_{max}$ is taken as the frequency index of the corresponding pitch frequency. Such decision logic may detect higher pitch frequencies for which the harmonic distance is relatively high and thus the median value of the PWVT[m, $k_{max}$] may provide a good estimate of the noise floor.

However, for the voiced speech with lower pitch value, the harmonic lines are so close that they are somehow overlapped and the median value is too large to be considered as a threshold. Thus, according to another exemplary embodiment, to resolve such a technical problem, a second criterion may be applied to make the voicing decision based on a second threshold, which is the moving average of PWVT[m, $k_{max}$] over the non-speech frames. According to another exemplary embodiment, this second decision criteria is based on a feedback from the first criteria and updates the moving average value, only at the frames that are not considered as voiced frames. More specifically, at the initialization time, only the first criteria is applied and for the frames that are not taken as voiced, the moving average is being updated ($MA_{PWVT_{noise}}$). According to another exemplary embodiment, after one hundred updates, the second criterion may be started to be considered as a threshold and the frame may be taken as voiced if either of the two criteria are met, (for example, PWVT[m, $k_{max}$]>$50N_f$ or PWVT[m, $k_{max}$]>$2MA_{PWVT_{noise}}$). As the analysis window is 60 msec long, the computed pitch value belongs to the central frame and, as such, the algorithm has 30 msec of inherent latency (delay in computation of the pitch value for each new frame).

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art (for example, features associated with certain configurations of the invention may instead be associated with any other configurations of the invention, as desired).

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A method of pitch detection, comprising executing, by at least one processor, the steps of:
receiving, on the processor, a signal;
sampling the signal to generate a discrete time signal;
generating a complex valued discrete time signal from the discrete time signal, the complex valued discrete time signal comprising a filtered real portion and an unfiltered imaginary portion;
computing Pseudo Weigner Ville Transformation (PWVT) on the complex valued discrete time signal to generate a spectral representation of the signal;
computing a harmonic summation on the spectral representation to generate a pitch candidate; and
deciding the pitch candidate as a pitch value if a harmonic summation value of the pitch candidate is larger than a threshold.

2. The method of claim 1, further comprising:
applying Hilbert Transform to the discrete time signal to generate the complex valued discrete time signal, wherein the complex valued discrete time signal is low-pass filtered, buffered and down-sampled.

3. The method of claim 2, wherein when applying Hilbert Transform, a half band Finite-Impulse-Response (FIR) filter is applied to the discrete time signal for a real part of the complex valued discrete time signal, and the discrete time signal is shifted in an amount of $\pi/2$ for an imaginary part of the complex valued discrete time signal.

4. The method of claim 2, wherein an anti-aliasing low-pass filter with cut-off frequency of 1 kHz is applied to low-pass filter the complex valued discrete time signal.

5. The method of claim 2, wherein the complex valued discrete time signal is buffered to form the analysis window with a 60 msec length.

6. The method of claim 2, wherein the complex valued discrete time signal is down sampled by a factor 4.

7. The method of claim 1, wherein the PWVT is computed by Fourier Transform as a frequency domain representation of the signal.

8. The method of claim 1, wherein the PWVT is computed by 512 points Discrete Fast Fourier Transform (DFFT) of a down-sampled Hilbert transform of the signal to form a frequency domain representation of the signal over time in the frequency range of 0 to 1 Khz.

9. The method of claim 1, wherein the harmonic summation is computed within a human pitch frequency range.

10. The method of claim 1, wherein the pitch candidate is a corresponding frequency location of a maximum value of the harmonic summation.

11. The method of claim 1, wherein the threshold is fifty times of a median value of the spectral representation.

12. The method of claim 1, wherein the signal is each frame of a speech signal.

13. The method of claim 12, wherein the threshold comprises a first threshold and a second threshold, the first threshold is the median value of the spectral representation which is generated by the PWVT and the second threshold is an average value of maximum values of harmonic summations of the frames of the speech signal in which the pitch value is not detected, and the average value is computed over more than one hundred frames of the speech signal in which the pitch value is not detected.

* * * * *